United States Patent
Lint et al.

(10) Patent No.: US 7,360,103 B2
(45) Date of Patent: Apr. 15, 2008

(54) P-STATE FEEDBACK TO OPERATING SYSTEM WITH HARDWARE COORDINATION

(75) Inventors: Bernard J. Lint, Mountain View, CA (US); Alon Naveh, Ramat Hasharon (IL); Shivnandan D. Kaushik, Portland, OR (US); Jeffrey R. Wilcox, Folsom, CA (US); Lance E. Hacking, Austin, TX (US); Ping Sager, Portland, OR (US); Kushagra Vaid, San Jose, CA (US); Todd A. Dutton, Southborough, MA (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 10/850,775

(22) Filed: May 21, 2004

(65) Prior Publication Data

US 2005/0262365 A1    Nov. 24, 2005

(51) Int. Cl.
*G06F 1/00* (2006.01)
*G06F 3/00* (2006.01)

(52) U.S. Cl. .......................... 713/300; 710/16; 710/18
(58) Field of Classification Search ................ 713/300, 713/320, 323, 501, 322; 710/16, 18
See application file for complete search history.

(56) References Cited

U.S. PATENT DOCUMENTS

| | | | | |
|---|---|---|---|---|
| 5,481,733 A | * | 1/1996 | Douglis et al. | 713/324 |
| 5,954,820 A | * | 9/1999 | Hetzler | 713/323 |
| 6,076,171 A | * | 6/2000 | Kawata | 713/501 |
| 7,143,203 B1 | * | 11/2006 | Altmejd | 710/16 |

* cited by examiner

*Primary Examiner*—Suresh K Suryawanshi
(74) *Attorney, Agent, or Firm*—Blakely, Sokoloff, Taylor & Zafman LLP

(57) ABSTRACT

A mechanism for P-state feedback to operating system (OS) with hardware coordination is described herein. In one embodiment, an example of a process includes, but is not limited to, receiving data from a processor representing an average performance over a previous period of time, and determining a performance state (P-state) for a next period of time based in part on the data representing the average performance over the previous period of time. Other methods and apparatuses are also described.

48 Claims, 6 Drawing Sheets

P-STATE FEEDBACK TO OPERATING SYSTEM WITH HARDWARE COORDINATION

FIELD

Embodiments of the invention relate to power management of a data processor system; and more specifically, to power management of a multiprocessor system.

BACKGROUND

Multiprocessor computer systems include multi-threaded processors in which a single physical processor is segmented into multiple logical processors, and multicore processors in which multiple processor cores are present in a single package or multiple packages.

Mobile computers such as notebook personal computers (PCs) typically incorporate certain power management techniques. One such technique is an adaptive technology that provides for changing both the operating voltage and frequency of the processor such that transition to a lower frequency (e.g., performance) point leads to a cubic reduction in power consumption by the processor at the lower frequency point.

Some mobile computers include processors that have performance states (P-state) that are controlled through operating systems. A processor may be able to operate in multiple P-states, with each varying in performance as well as varying in the amount of power consumption. Some current operating systems use this technique so that the processor is placed at an operating frequency that matches the processor utilization. For example, if the processor is idle 50% of the time, then the operating system places the processor at a frequency that is 50% of the maximum operating frequency.

FIG. 1 is a flow diagram illustrating a typical process for setting a P-state of a processor. The process 100 of FIG. 1 may be performed by an operating system (OS) during an idle time. Referring to FIG. 1, at block 101, the OS enters an idle loop. At block 102, the OS computes a busy ratio of the processor. At block 103, the OS re-computes a target P-state based on the computed busy ratio and the current performance of the processor. At block 104, the OS signals new target P-state to be set in the processor. Thereafter, at block 105, the OS exits the idle loop and executes the applications while the processor transitions into the new target P-state at block 106.

In a multiprocessor system, the OS typically computes the target P-state for each processor independently of the others. However, controlling P-states in multiprocessor systems can have a negative effect when multiple processor cores, logical or otherwise, are on the same integrated circuit and their P-states are being controlled independently. This is because the OS does not consider the effects of it's selection of the P-state for one processor upon other processors in the system when specifying the frequency and/or voltage changes applied to one processor and those changes would be applied to one or more other processors on the chip. For example, the OS could determine a first logical processor should be in a P-state with a lower performance than the P-state of a second logical processor on the same chip. This causes the chip as a whole to transition to a lower performance state and the second logical processor performance be forced to operate in the P-state below the performance level in which it is operating.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
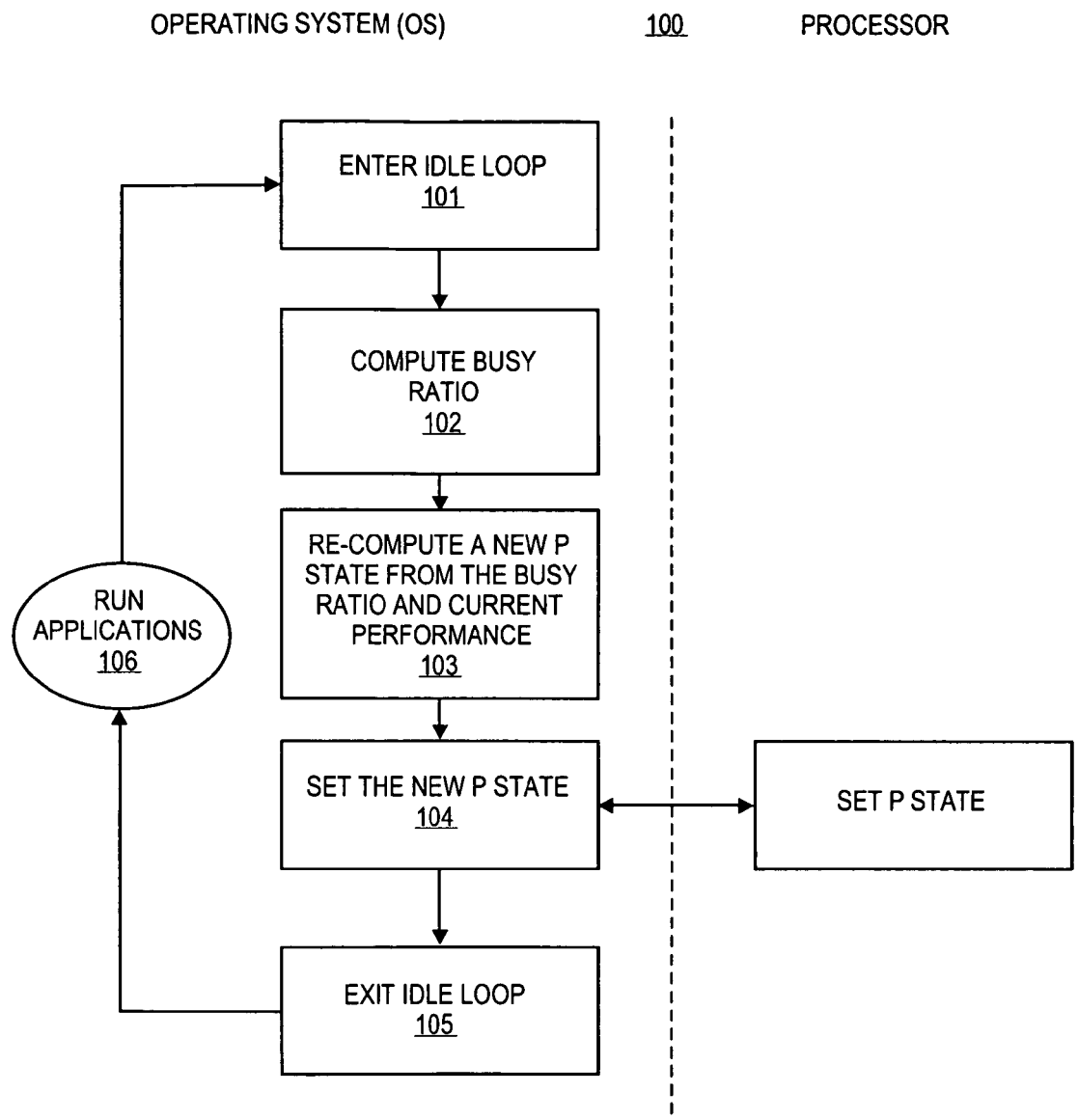
FIG. 1 is a flow diagram illustrating a process for setting a P-state of a processor.

A mechanism for hardware coordination of performance states (P-states) among multiple agents is described. In a computer system having multiple cores, logical or otherwise, the OS sets a P-state for each of the multiple cores. The operating system operates in conjunction with the underlying hardware as if there were no dependencies between processors (e.g., making a decision for a P-state transition independently for each logical processor). Hardware on the chip has the responsibility for ensuring that the underlying dependencies are appropriately resolved to provide for the best performance while saving power. This is referred to herein as hardware coordination.

More specifically, when using hardware coordination, hardware receives the P-state specified for the processor and causes the processor to transition to that P-state. However, if there are multiple logical processors (e.g., multiple cores or threads), the hardware may not put one or more of the logical processors into the P-state specified by the OS. The OS does not know about the decision made by the underlying hardware to resolve a dependency between cores/logical processors. Thus, there may be a difference between the P-state into which the OS specifies a processor to enter and the P-state the processor actually enters due to the hardware coordination. In such cases, the OS may not be aware that the processor entered a different P-state than the one specified.

For example, in one embodiment, when the OS makes a request to transition a hardware-coordinated processor into a P-state (e.g., a first P-state), dependent upon the existing dependencies with other logical cores/processors, the hardware may make either a partial or complete transition to the requested P-state (e.g., a second P-state). In case of a partial transition, the logical processor may attempt to perform changes at a later time to transition to another P-state (e.g., the third P-state) and/or the originally requested P-state (e.g., the first P-state) without the knowledge of the OS. That is, the OS does not know the changes of P-states of the underlying hardware (e.g., from first to second, third, and/or first P-states) during two successive P-state requests.

This discrepancy between the OS perception of the P-state in which a processor is operating could lead to an incorrect decision by the OS in the future when selecting P-states, resulting in non-optimal power savings or poor performance or both. This can cause variation in the dynamic performance of the processor between successive OS requests for P-state changes.

Accordingly, in one embodiment, a P-state feedback technique independently receives data from a processor representing an average performance of a processor (e.g., a logical processor) over a previous period of time and determines a performance state (P-state) for a next period of time based in part on the data representing the average performance over the previous period of time.

In the presence of hardware coordination, in one embodiment, a framework provides information back to the OS such that the OS can make a decision when choosing the next P-state for a particular processor. As a result, the OS is better able to make a decision with respect to choosing P-state policy in the presence of underlying hardware coordination of P-states. The feedback may consist of the average performance. In one embodiment, average performance provides information back to the OS indicating the percentage number of cycles spent doing useful work (e.g., not idle) in the last predetermined interval since the OS makes a request to set the P-state for that processor.

In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions that follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), erasable programmable ROMs (EPROMs), electrically erasable programmable ROMs (EEPROMs), magnetic or optical cards, or any type of media suitable for storing electronic instructions, and each of the above storage components is coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 2:
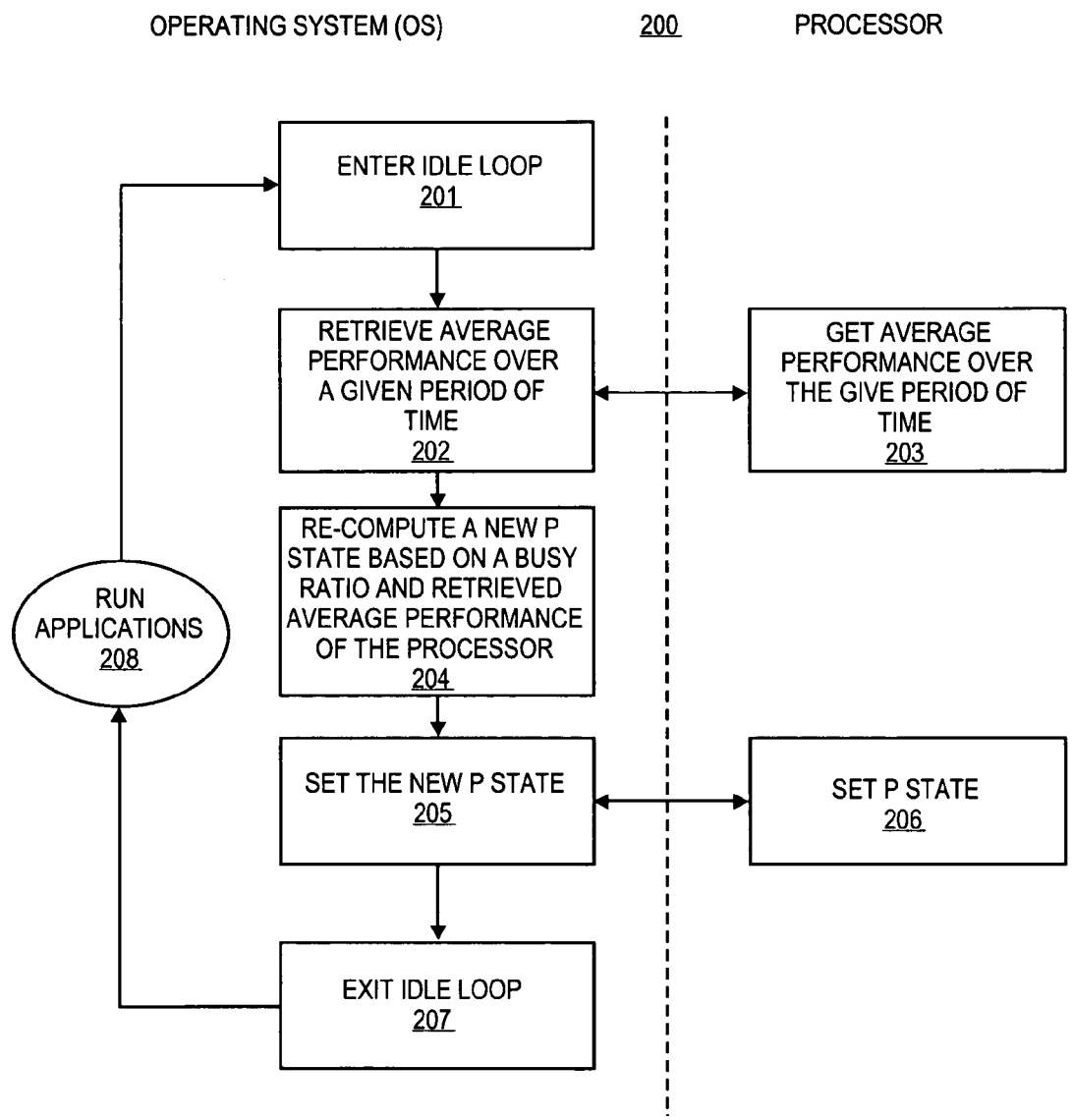
FIG. 2 is a flow diagram of one embodiment of a process for determining and setting a P-state of a processor.

FIG. 2 is a flow diagram of one embodiment of a process for determining and setting a P-state of a processor. The process example 200 may be performed by a processing logic that may comprise hardware (circuitry, dedicated logic, etc.), software (such as is run on a dedicated machine), or a combination of both. For example, the process may be performed by a software (e.g., an operating system). In one embodiment, the process includes, but is not limited to, receiving data from a processor representing an average performance over a previous period of time, and determining a performance state (P-state) for a next period of time based in part on the data representing the average performance over the previous period of time.

Referring to FIG. 2, at block 201, the OS (also referred to herein as software) enters an idle loop. At block 202, the OS communicates with the processor to retrieve an average performance over a given period of time since the last request made by the OS to enter a P-state. The OS may communicate with the processor via a variety of mechanisms, such as, for example, a PAL (processor abstract layer) call and/or via an MSR (machine specific register) interface. Other mechanisms such as BIOS (basic input/output system) or EFI (extensible firmware interface) may be utilized.

At block 203, the processor calculates the average performance over the given period of time. In one embodiment, the processor periodically or constantly monitors the performance and calculates the average performance over a period of time. Once the request for retrieving an average performance is received, the processor returns the result of the average performance. Detailed information regarding computing the average performance will be described further in detail below.

At block 204, the OS re-computes a new P-state based on a busy ratio and the retrieved average performance of the processor. In one embodiment, the busy ratio is defined as the percentage of time the processor is busy executing instructions and not idle. The busy ratio may be maintained by the OS. In one embodiment, the new P-state is determined based on a product (e.g., a multiplication) of the busy ratio and the retrieved average performance of the processor over the given period of time.

At block 205, the OS requests the processor to enter the new P-state, and at block 206, the processor receives such a request and may enter the specified P-state. At block 207, the OS exits the idle loop and execute one or more applications at block 208 while in the P-state set by the processor. Other operations may also be performed.

Figure 3:
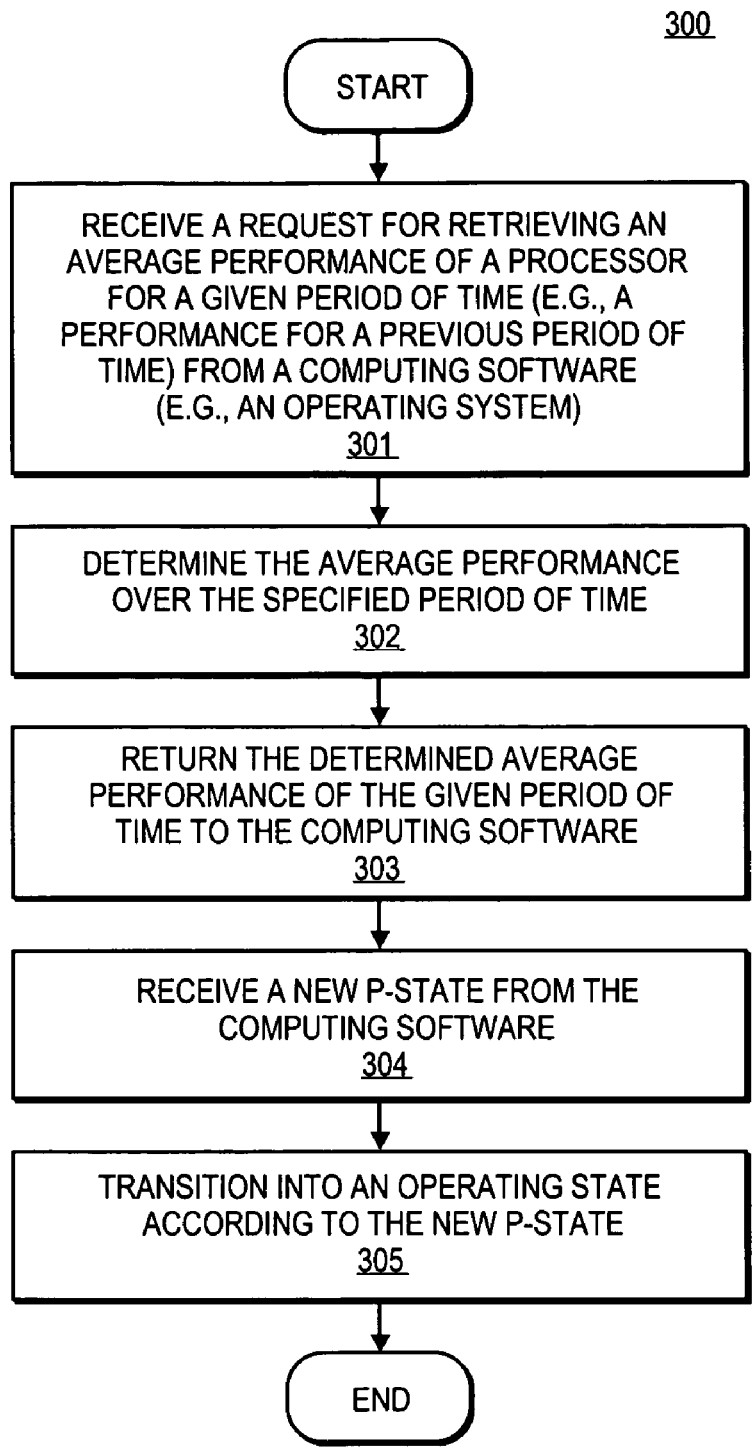
FIG. 3 is a flow diagram of another embodiment of a process for setting a P-state of a processor.

FIG. 3 is a flow diagram of one embodiment of a process for setting a P-state of a processor. The process example 300 may be performed by processing logic that may comprise hardware (circuitry, dedicated logic, etc.), software (such as is run on a dedicated machine), or a combination of both. For example, the process example 300 may be performed by a firmware and/or hardware of a processor. In one embodiment, the process example 300 includes, but is not limited to, receiving a request from a software to query an average performance of a processor over a previous period of time, and in response to the request, returning data representing the average performance of the processor over the previous period of time to the software, the data presenting the average performance over the previous period of time being used to determine a performance state (P-state) in which the processor operates over a next period of time.

Referring to FIG. 3, at block 301, processing logic receives a request from the OS to provide an average performance of the processor for a given period of time. In one embodiment, the period of time may be a period of time since a last request is received from the software. At block 302, processing logic determines the average performance of over the given period of time. In one embodiment, the processing logic internally periodically and/or constantly maintains data indicative of the average performance of the processor. Such a process may be performed substantially concurrently by the processor with respect to processes of the OS software, such as, for example, process example 200 of FIG. 2. The average performance over a given period of time may be determined via a variety of ways, which will be described in details further below.

At block 303, processing logic returns the data indicative of the average performance to the software. In one embodiment, the returned average performance of the processor may be used by the OS software to determine a P-state for a next period of time. Subsequently, at block 304, the new P-state for the next period of time is received from the OS software, and at block 305, the processor transitions into a state according to the new P-state, which may or may not be the specified P-state. For example, when the OS specifies a first P-state via SET_PSTATE command, the logical processor receives the first P-state. However, due to the coordination between this logical processor and other logical processors, the logical processor may enter a second P-state as a result of the coordination of other logical processors. The OS may subsequently query the updated P-state from the logical processor via a GET_PSTATE command in order to determine a next P-state for the next period of time. Other operations may also be performed.

Figure 4:
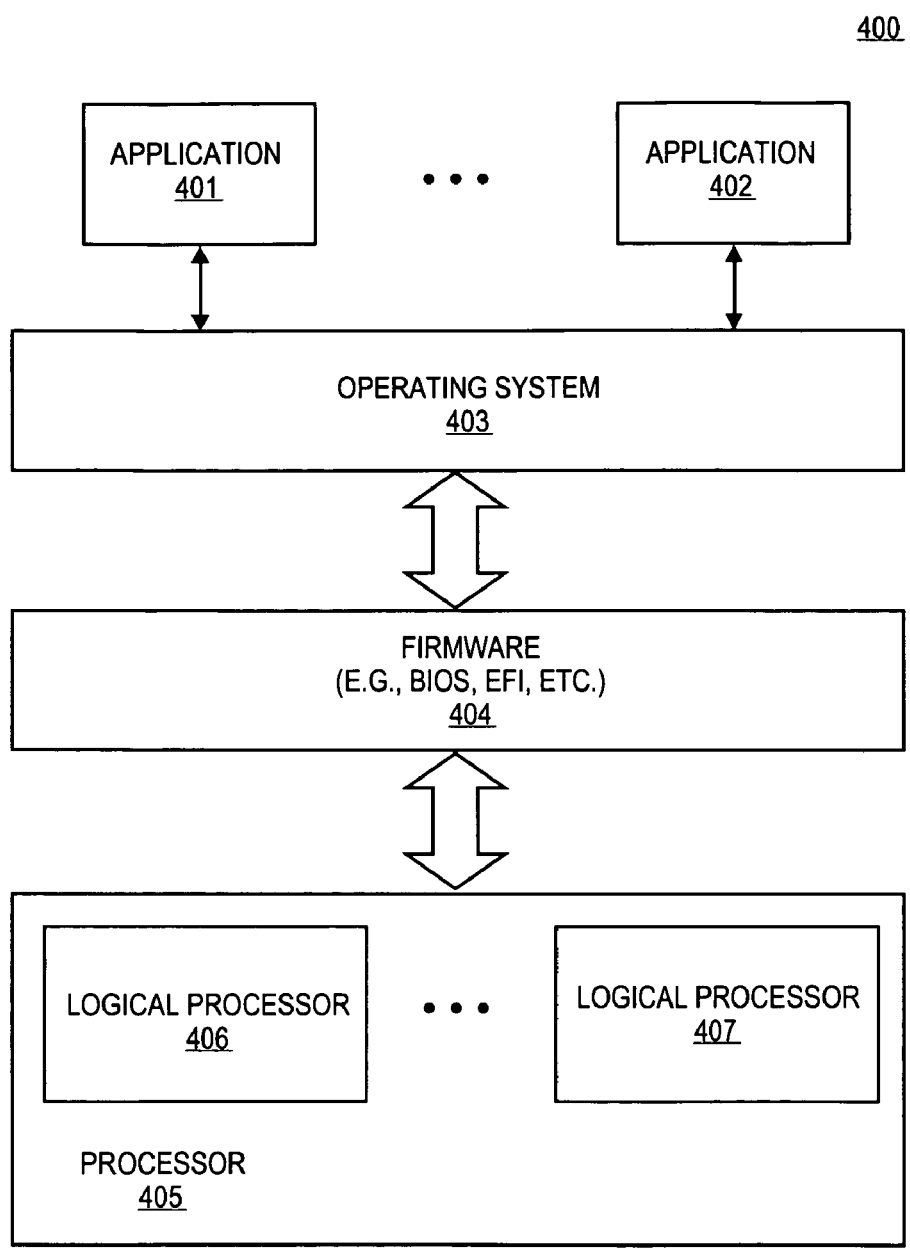
FIG. 4 is a block diagram of one embodiment of a system for setting a P-state of a processor.

FIG. 4 is a block diagram illustrating an example of a system for setting a P-state of a processor according to one embodiment. In one embodiment, the system example 400 includes, but is not limited to, an operating system (OS) 403 to run one or more applications 401-402 via one or more threads or processes, firmware 404, and a processor 405 having one or more logical processors (or cores) 406-407.

OS 403 may be an operating system from a variety of vendors, such as, for example, a Windows operating system from Microsoft or a Mac OS from Apple Computer. Alternatively, OS 403 may be a Unix or a Linux operating system. Other operating systems, such as embedded or real-time operating systems may be implemented.

Firmware 404 may be implemented as BIOS, particularly, an ACPI (advanced configuration and power interface) compatible BIOS, or alternatively, a firmware having an EFI interface. In one embodiment, processor 405 has hyperthreading technology.

In one embodiment, each of logical processors 406-407 may be configured to operate in a respective P-state independent of the rest of the logical processors, while logical processors 406-407 may have their performance (e.g., P-states) coordinated by firmware 404. According to one embodiment, when OS 403 enters an idle loop, OS 403 communicates with each of logical processors 406-407 to retrieve average performance information of the respective logical processor over a period of time. OS 403 then uses the average performance of the logical processor and a busy ratio of the logical processor maintained by OS 403 to determine a P-state for a next period of time that the respective logical processor should enter.

That is, OS 403 uses the average performance of a previous period of time to determine a P-state that the respective processor should enter for the next period of time. In one embodiment, the previous period of time is determined based on a period of time from the last access of the processor from OS 403 to the current access of the processor from OS 403.

Although an OS has been used as an example throughout the present application to specify a P-state of a logical core/processor of a multiprocessor system, the techniques described herein are not limited to being performed by an OS. It will be appreciated that other components, such as, for example, a dedicated application that is capable of performing such operations, may be utilized. For example, an application that can operate in a special mode or a supervisory mode may access the firmware and/or hardware to retrieve and specify a P-state from and to a processor. Other configurations may be implemented.

According to one embodiment, one or more firmware procedures are provided to allow OS 403 to request a P-state change (also referred to as a SET_PSTATE function), and to return the processor's dynamic performance to the OS for managing system utilization (also referred to as a GET_PSTATE function). In one embodiment, each of logical processors 406-407 internally calibrates the performance on a scale of 0 . . . 100, with the value 100 signifying the maximum achievable performance. Each P-state has a corresponding performance index, Pn, with P0 always having a value of 100 (highest performance P-state) and other P-states 0 to n having a value, in the range 0-100, equal to the relative performance of P-state Pn to P-state P0. OS 403 is notified about these values via a P-state query call (also referred to as a PSTATE_INFO function).

In one embodiment, the hardware implements multiple internal counters that are used to compute the dynamic processor performance. In one embodiment, three counters may be maintained as follows:

Counter1 keeps track of the time period between successive GET_PSTATE calls. It obtains reset when the GET_PSTATE call returns back to the OS. It counts the processor core clocks until the next GET_PSTATE call is made.

Counter2 keeps track of the time spent in the current P-state. Every time the P-state changes (by the hardware due to the coordination policy), the Counter2 value is used to compute the Counter3 value. Counter2 is then reset to start counting the time spent in the next P-state.

Counter3 keeps track of the cumulative performance index of the processor.

These counters are used by the firmware to compute a weighted-average sum of the processor performance values corresponding to the different P-states that the processor operates in for the time period. In one embodiment, when a GET_PSTATE is called by the OS (e.g., first call), all counters are reset to a predetermined known state. For example, Counter1=Counter2=Counter3=0. When an implicit change is made to the P-state of the processor due to the coordination among the logical processors 406-407 (e.g., internal change, not visible to OS), some or all of the counters may be updated. In one embodiment, such a update may include at least the followings:

Counter3=Counter3+Counter2*(performance_index corresponding to current P-state)

Subsequently, when a GET_PSTATE is called by the OS again (e.g., second call), the processor may perform at least the followings:

Average performance=Counter3/Counter1
Return Average performance to the OS
Reset counters to a known state: Counter1=Counter2= Counter3=0

For example, it is assumed that the first GET_PSTATE procedure was called at time $t_0$, when the processor was operating in state P0. The previous SET_PSTATE procedure requested a transition from P0 to P3. The transition happened over a period of time, such that the logical processor went through states P1 at time $t_1$, P2 at time $t_2$ and P3 at time $t_3$, and was in state P3 at time $t_4$ when the current GET_PSTATE procedure was called. According to one embodiment, the performance represented by a performance_index returned is calculated as:

$$\text{performance\_index} = $$

$$\frac{\begin{array}{l}((\text{time spent in } P0 \text{ after the previous GET\_PSTATE}) * \\ (\text{performance\_index for } P0) + \\ (\text{time spent in } P1) * (\text{performance\_index for } P1) + \\ (\text{time spent in } P2) * (\text{performance\_index for } P2) + \\ (\text{time spent in } P3 \text{ upto the current GET\_PSTATE}) * \\ (\text{performance\_index for } P3))\end{array}}{(\text{time interval between previous and current GET\_PSTATE})} =$$

$$\frac{(t_1 - t_0) * pf_0 + (t_2 - t_1) * pf_1 + (t_3 - t_2) * pf_2 + (t_4 - t_3) * pf_3}{(t_4 - t_0)}$$

As described above, for hardware-coordinated processors, the GET_PSTATE procedure allows the OS to get feedback on the dynamic performance of the processor over the last time period. The OS can then use this information to obtain better system utilization over the next time period by changing the P-state in correlation with the current workload demand.

For example, if the busy ratio for a given period was 100%, and the performance_index returned by GET_PSTATE was 60, then this indicates that the P-state for the next time period should be P0 (which has performance index of 100). The caller (e.g., the OS) would then call the SET_PSTATE procedure to transition the processor to the P0 state. That is, if the busy ratio is greater than the performance_index returned by GET_PSTATE, the OS responds to the increased demand requirement of the workload by transitioning the processor to a higher-performance P-state. Alternatively, if the busy ratio is lower than the performance_index returned by GET_PSTATE, the OS responds by transitioning the processor to a lower performance P-state, which consumes less power and operates at reduced performance. Such an adaptive policy enables the OS to dynamically respond to system workload characteristics using P-states allows for efficient power utilization. As a result, the processor consumes additional power by operating at a higher performance level only when the current workload requires it to do so.

Figure 5:
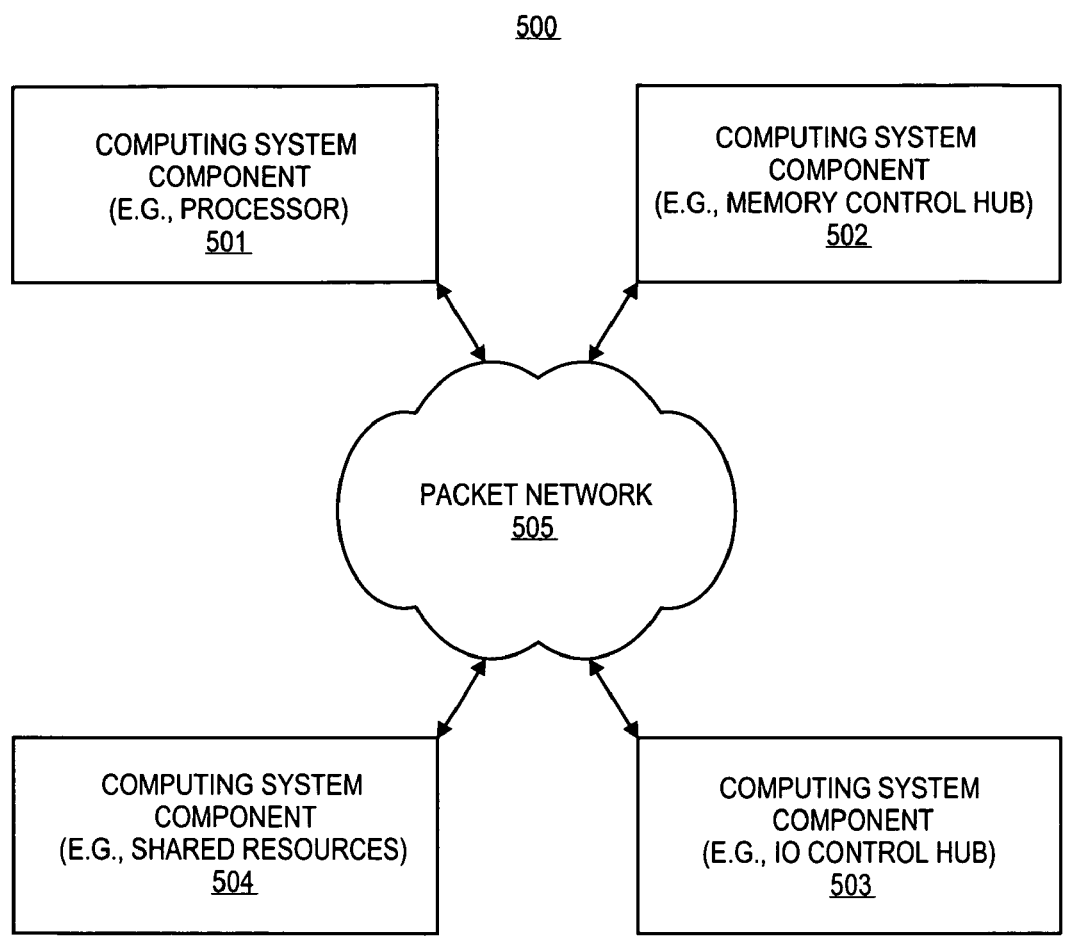
FIG. 5 is a block diagram of one embodiment of a data processing system.

FIG. 5 is a block diagram illustrating an example of a data processing system according to one embodiment. Note that while FIG. 5 illustrates various components of a computer system, it is not intended to represent any particular architecture or manner of interconnecting the components, as such details are not germane to the present invention. It will also be appreciated that network computers, handheld computers, cell phones, and other data processing systems that have fewer components or perhaps more components may also be used with the present invention.

As shown in FIG. 5, the computer system 500, which is a form of a data processing system, includes multiple computing system components 501-504 coupled with each other via a packet network. In one embodiment, each of the system components may include an interface compatible with a common system interface (CSI) that enables the respective component to communicate with one or more other system components using a variety communication protocols, such as, for example, a point-to-point protocol, over the packet network 505. In a case of a CSI system, system components 501-504 may be referred to as CSI agents having a network stack including, but is not limited to, a protocol layer, a transport layer, a routing layer, a link layer, and a physical layer.

Components are those portions of a computing system having a specific function from an architectural perspective of the computing system. A component may therefore be any of the followings: a processor, a memory, a memory controller, a cache, a cache controller, a graphics controller, an I/O controller, and an I/O device (e.g., a hard disk drive, a networking interface, etc.) A component may also be a combination of components (e.g., an integrated memory controller and processor).

For example, system component 501 may be microprocessor from a variety of vendors, while system components 502 and 503 may be a memory control hub and an IO control hub. The packet network 505 also interconnects other various components, such as a display controller and display device, as well as to input/output (I/O) devices, which may be mice, keyboards, modems, network interfaces, printers, and other devices which are well-known in the art. Alternatively, these IO devices may be coupled to an IO control hub.

A resource may be any functional part of a computing system such as a component 504 or some other functional part (e.g., a clock source, a power supply, etc.) Packet network 505 may be a network designed to transport packets. Packets are data structures having a header and payload, where the header may include routing information such as the source address and/or destination address of the packet, and/or a connection identifier that identifies a connection that effectively exists in the network to transport the packet.

In one embodiment, a microprocessor, which may be implemented as a system component and/or a CSI agent (e.g., component 501), may include multiple logical processors or cores. Each of the logical processors may operate independently in a P-state. For example, the microprocessor may be implemented as processor 405 of FIG. 4. According to one embodiment, an operating system (OS), which may be running within a memory that may be coupled to a memory control hub, during an idle period, communicates with the processor to retrieve an average performance for the previous period of time (e.g., a period of time since the last time when the OS contacted the processor) of a logical processor within the processor. The OS then determines a P-state for a next period of time based on the retrieved average performance for the previous period of time and the busy ratio of the logical processor. Thereafter, the OS communicates with the processor to instruct the respective logical processor to enter an operating state corresponding to the new P-state, which may or may not be entered due to coordination among the logical processors within the physical processor. As a result, the logical processor of the microprocessor is operating in an appropriate state based on the current workload and the average performance for the previous time period.

Figure 6:
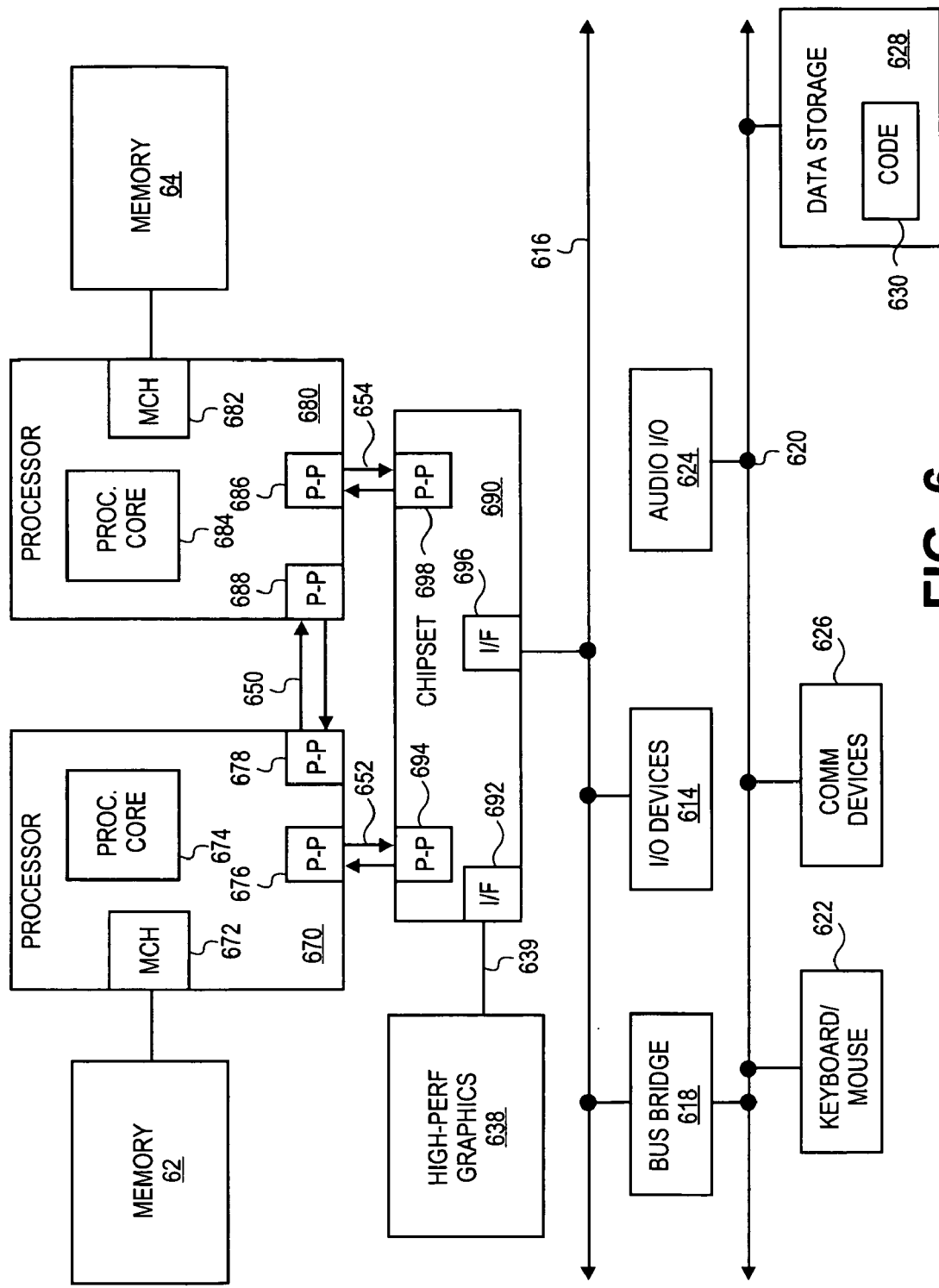
FIG. 6 is a block diagram of one embodiment of a computer system.

FIG. 6 illustrates a computer system that is arranged in a point-to-point (PtP) configuration. In particular, FIG. 6 shows a system where processors, memory, and input/output devices are interconnected by a number of point-to-point interfaces.

The FIG. 6 system may also include several processors, of which only two, processors 670 and 680 are shown for clarity. Processors 670 and 680 include a processor 674 and 684 that includes logic and circuitry to execute instructions. Processors 670 and 680 may each include a local memory controller hub (MCH) 672 and 682 to connect with memory 62 and 64, respectively. Processors 670 and 680 may exchange data via a point-to-point interface 650 using point-to-point interface circuits 678 and 688, respectively. Processors 670 and 680 may each exchange data with a chipset 690 via individual point-to-point interfaces 652 and 654, respectively, using point-to-point interface circuits 676 and 694 and 686 and 698, respectively. Chipset 690 may also exchange data with a high-performance graphics circuit 638 via a high-performance graphics interface 692.

At least one embodiment of the invention may be located within the memory controller hub 672 or 682 of the processors. Other embodiments of the invention, however, may exist in other circuits, logic units, or devices within the system of FIG. 6. Furthermore, other embodiments of the invention may be distributed throughout several circuits, logic units, or devices illustrated in FIG. 6.

Another bus 616 (e.g., a PCI bus) may be coupled to chipset 690. I/O devices 614 and a bus bridge 618 may be coupled to bus 616. Bus bridge 618 may be coupled to another bus 620 (e.g., an ISA bus). Other components coupled to bus 620 may include a keyboard/mouse 622, communication devices 626 and data storage 628 (which may store code 630, which when executed may cause one or more of the operations described herein to be performed.

Thus, a P-state feedback mechanism is described that provides feedback to an OS regarding performance of processors on an integrated circuit has been described herein. In the foregoing specification, the invention has been described with reference to specific exemplary embodiments thereof. Various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   receiving data from a processor representing an average performance over a previous period of time;
   calculating a busy ratio of the processor over the previous period of time, the busy ratio representing a percentage of utilization of the processor; and
   determining a performance state (P-state) for a next period of time based on the data representing the average performance over the previous period of time and the busy ratio of the processor.

2. The method of claim 1, wherein the average performance of the previous period of time comprises performance over a plurality of P-states in which the processor operates during the previous period of time, the plurality of P-states including at least one P-state other than a previous P-state specified for the processor to enter during the previous period of time.

3. The method of claim 1, wherein the average performance of the previous period of time comprises performance of the processors in a P-state other than a previous P-state specified for the processor that the processor was requested to enter during the previous period of time, but was not entered due to a coordination of the processor with other processors.

4. The method of claim 1, wherein the average performance of the previous period of time comprises performance over a plurality of P-states in which the processor operates during the previous period of time.

5. The method of claim 1, further comprising issuing a request to the processor to retrieve the average performance from the processor, wherein the average performance is retrieved in response to the issued instruction.

6. The method of claim 1, further comprising programming the processor to operate in a manner according to the determined P-state over the next period of time.

7. The method of claim 1, wherein the processor is one of a plurality of logical processors within a physical processor.

8. A machine-readable storage medium having executable code to cause a machine to perform a method, the method comprising:
   receiving data from a processor representing an average performance over a previous period of time;
   calculating a busy ratio of the processor over the previous period of time, the busy ratio representing a percentage of utilization of the processor; and
   determining a performance state (P-state) for a next period of time based on the data representing the average performance over the previous period of time, the busy ratio of the processor and a demand of a current workload.

9. The machine-readable storage medium of claim 8, wherein the average performance of the previous period of time comprises performance over a plurality of P-states in which the processor operates during the previous period of time, the plurality of P-states including at least one P-state other than a previous P-state specified for the processor to enter during the previous period of time.

10. The machine-readable storage medium of claim 8, wherein the average performance of the previous period of time comprises performance of the processors in a P-state other than a previous P-state specified for the processor that the processor was requested to enter during the previous period of time, but was not entered due to a coordination of the processor with other processors.

11. The machine-readable storage medium of claim 8, wherein the method further comprises issuing a request to the processor to retrieve the average performance from the processor, wherein the average performance is retrieved in response to the issued instruction.

12. The machine-readable storage medium of claim 8, wherein the method further comprises programming the processor to operate in a manner according to the determined P-state over the next period of time.

13. The machine-readable storage medium of claim 8, wherein the processor is one of a plurality of logical processors within a physical processor.

14. A data processing system, comprising:
a processor having a plurality of logical processors;
a memory coupled to the processor, the memory having one or more instructions, when executed by the processor, cause the processor to
receive data from one of the plurality of logical processors representing an average performance over a previous period of time,
calculating a busy ratio of one of the plurality of logical processors over the previous period of time, the busy ratio representing a percentage of utilization of the one of the plurality of logical processors; and
determine a performance state (P-state) for a next period of time for the respective logical processor based on the data representing the average performance over the previous period of time and the busy ratio.

15. The system of claim 14, wherein the average performance of the previous period of time comprises performance over a plurality of P-states in which the logical processor operates during the previous period of time, the plurality of P-states including at least one P-state other than a previous P-state specified for the logical processor to enter during the previous period of time.

16. The system of claim 14, wherein the average performance of the previous period of time comprises performance of the processors in a P-state other than a previous P-state specified for the logical processor that the logical processor was requested to enter during the previous period of time, but was not entered due to a coordination of the processor with other logical processors.

17. The system of claim 14, wherein the P-state for the next period of time is determined further based on a busy ratio representing a percentage of the utilization of the logical processor.

18. The system of claim 14, further comprising calculating a busy ratio of the processor over the previous period of time, the busy ratio representing a percentage of the utilization of the processor, and wherein the P-state for the next period of time is determined further based on the busy ratio of the processor over the previous period of time.

19. The system of claim 14, wherein the average performance of the previous period of time comprises performance over a plurality of P-states in which the processor operates during the previous period of time.

20. The system of claim 14, further comprising issuing a request to the processor to retrieve the average performance from the processor, wherein the average performance is retrieved in response to the issued instruction.

21. The system of claim 14, further comprising programming the processor to operate in a manner according to the determined P-state over the next period of time.

22. A method, comprising:
receiving a request from a software to query an average performance of a processor over a previous period of time and a busy ratio of the processor over the previous period of time; and
in response to the request, returning data and the busy ratio to the software, the data representing the average performance of the processor over the previous period of time, the busy ratio representing a percentage of utilization of the processor, and presenting the average performance over the previous period of time and the percentage of utilization of the processor being used to determine a performance state (P-state) in which the processor operates over a next period of time.

23. The method of claim 22, wherein the average performance of the previous period of time comprises performance over a plurality of P-states in which the processor operates during the previous period of time, the plurality of P-states including at least one P-state other than a previous P-state specified for the processor to enter during the previous period of time.

24. The method of claim 22, wherein the average performance of the previous period of time comprises performance of the processors in a P-state other than a previous P-state specified for the processor that the processor was requested to enter during the previous period of time, but was not entered due to a coordination of the processor with other processors.

25. The method of claim 22, wherein the average performance of the previous period of time comprises performance over a plurality of P-states in which the processor operates during the previous period of time.

26. The method of claim 22, further comprising determining the data representing the average performance over the previous period of time prior to returning the data.

27. The method of claim 22, further comprising:
receiving the P-state for the next period of time from the software; and
programming the processor to operate according to the received P-state.

28. The method of claim 22, wherein the processor is one of a plurality of logical processors within a physical processor.

29. The method of claim 22, wherein the software is a part of an operating system (OS).

30. A machine-readable storage medium having executable code to cause a machine to perform a method, the method comprising:
receiving a request from a software to query an average performance of a processor over a previous period of time and a busy ratio of the processor over the previous period of time; and
in response to the request, returning data representing the average performance of the processor over the previous period of time to the software and the busy ratio representing a percentage of utilization of the processor, the data presenting the average performance over the previous period of time and the busy ratio being used to determine a performance state (P-state) in which the processor operates over a next period of time.

31. The machine-readable storage medium of claim 30, wherein the average performance of the previous period of time comprises performance over a plurality of P-states in which the processor operates during the previous period of time, the plurality of P-states including at least one P-state other than a previous P-state specified for the processor to enter during the previous period of time.

32. The machine-readable storage medium of claim 30, wherein the average performance of the previous period of time comprises performance of the processors in a P-state other than a previous P-state specified for the processor that the processor was requested to enter during the previous period of time, but was not entered due to a coordination of the processor with other processors.

33. The machine-readable storage medium of claim 30, wherein the method further comprises determining the data representing the average performance over the previous period of time prior to returning the data.

34. The machine-readable storage medium of claim 30, wherein the method further comprises: receiving the P-state for the next period of time from the software; and programming the processor to operate according to the received P-state.

35. The machine-readable storage medium of claim 30, wherein the processor is one of a plurality of logical processors within a physical processor.

36. The machine-readable storage medium of claim 30, wherein the software is a part of an operating system (OS).

37. A data processing system, comprising:
a processor having a plurality of logical processors;
a memory coupled to the processor, the memory having one or more instructions which, when executed by the processor, cause the processor to
receive a request from a software to query an average performance of one of the plurality of logical processors over a previous period of time and a busy ratio of one of the plurality of logical processors over the previous period of time, and
in response to the request, return data representing the average performance of the logical processor over the previous period of time to the software and the busy ratio representing a percentage of utilization of the logical processor, the data presenting the average performance over the previous period of time and the busy ratio being used to determine a performance state (P-state) in which the logical processor operates over a next period of time.

38. The system of claim 37, wherein the average performance of the previous period of time comprises performance over a plurality of P-states in which the logical processor operates during the previous period of time, the plurality of P-states including at least one P-state other than a previous P-state specified for the logical processor to enter during the previous period of time.

39. The system of claim 37, wherein the average performance of the previous period of time comprises performance of the logical processor in a P-state other than a previous P-state specified for the logical processor that the logical processor was requested to enter during the previous period of time, but was not entered due to a coordination of the processor with other logical processors.

40. The system of claim 37, further comprising determining the data representing the average performance over the previous period of time prior to returning the data.

41. The system of claim 37, wherein the instructions further cause the processor to: receive the P-state for the next period of time from the software; coordinate with other logical processors to determine a final P-state in consideration of the received P-state and the P-states of the other logical processors; and program the logical processor to operate in a state according to the determined final P-state.

42. A processor, comprising:
a plurality of logical processors; and
a firmware coupled to the plurality of logical processors to
receive a request from a software to query an average performance of at least one of the logical processors over a previous period of time and a busy ratio of the at least one of the logical processors over the previous period of time, and
in response to the request, return data representing the average performance of the at least one logical processor over the previous period of time to the software and the busy ratio representing a percentage of utilization of the at least one logical processor, the data presenting the average performance over the previous period of time and the busy ratio being used to determine a performance state (P-state) in which the at least one logical processor operates over a next period of time.

43. The processor of claim 42, wherein the average performance of the previous period of time comprises performance over a plurality of P-states in which the logical processor operates during the previous period of time, the plurality of P-states including at least one P-state other than a previous P-state specified for the logical processor to enter during the previous period of time.

44. The processor of claim 37, wherein the average performance of the previous period of time comprises performance of the processors in a P-state other than a previous P-state specified for the logical processor that the logical processor was requested to enter during the previous period of time, but was not entered due to a coordination of the processor with other logical processors.

45. The processor of claim 42, wherein the firmware determines and maintains the average performance for each of the logical processors over the previous period of time.

46. The processor of claim 42, wherein the firmware further receives the P-state for the next period of time from the software, coordinates with other logical processors to determine a final P-state in consideration of the received P-state and the P-states of the other logical processors, and programs the logical processor to operate in a state according to the determined final P-state.

47. A processor, comprising:
a plurality of logical processors;
means for receiving a request from a software to query an average performance of at least one of the logical processors over a previous period of time and a busy ratio of the at least one of the logical processors over the previous period of time; and
means for returning data representing the average performance of the at least one logical processor over the previous period of time to the software and the busy ratio representing a percentage of utilization of the at least one logical processor, in response to the request, the data presenting the average performance over the previous period of time and the busy ratio being used to determine a performance state (P-state) in which the at least one logical processor operates over a next period of time.

48. The processor of claim 47, wherein the average performance of the previous period of time comprises performance over a plurality of P-states in which the logical processor operates during the previous period of time.

* * * * *